United States Patent [19]

Austin-Lazarus et al.

[11] Patent Number: 5,422,931

[45] Date of Patent: Jun. 6, 1995

[54] DUAL MODE PORTABLE CELLULAR TELEPHONE HAVING SWITCH CONTROL OF THE RF SIGNAL PATH TO EFFECTUATE POWER SAVINGS

[75] Inventors: Phyllis Austin-Lazarus, San Diego; Brian Shirk, Muretta, both of Calif.

[73] Assignee: Hughes Aircraft Company, Los Angeles, Calif.

[21] Appl. No.: 125,433

[22] Filed: Sep. 22, 1993

[51] Int. Cl.⁶ ............................................. H04Q 7/32
[52] U.S. Cl. ...................................... 379/59; 455/83; 455/89; 455/33.1; 455/86
[58] Field of Search ................ 379/56, 58, 59; 455/62, 455/76, 83, 89, 95, 119, 127, 129, 183.2, 186.1, 280, 315, 317, 33.1, 86

[56] References Cited

U.S. PATENT DOCUMENTS

| | | | |
|---|---|---|---|
| 5,276,914 | 1/1994 | Ishizuka et al. | 455/83 |
| 5,276,917 | 1/1994 | Vanhanen et al. | 455/89 |
| 5,309,502 | 5/1994 | Hirai | 379/59 |

OTHER PUBLICATIONS

Fisher, "Dual Mode Mobile Unit for Next Generation Digital Narrow Channel Cellular Telephone System" IEEE 1988.

*Primary Examiner*—Curtis Kuntz
*Assistant Examiner*—William Cumming
*Attorney, Agent, or Firm*—Gordon R. Lindeen, III; Wanda K. Denson-Low

[57] ABSTRACT

A dual mode, portable cellular telephone utilizes an rf switch to control the rf signal path through its rf output stage. A voltage controlled oscillator (VCO) generates an rf signal that is selectively modulated with an fm modulation signal. In an FM modulation mode, the rf signal generated by the VCO is amplified by a first rf amplifier and a second rf amplifier, and then applied to a power amplifier. The power amplifier couples the amplified rf signal to an antenna for broadcasting. A first rf signal path through the rf output stage thus includes the VCO, first rf amplifier, second rf amplifier, and power amplifier, and the resulting rf output signal is FM modulated. In a digital modulation mode, the rf signal generated by the VCO is unmodulated, having a fixed frequency. This is achieved by making the fm modulation signal be a constant signal. The fixed frequency signal is amplified by the first rf amplifier and then applied to a digital modulator as a local oscillator signal. The digital modulator then modulates the local oscillator signal using appropriate modulation signals, and applies the resulting digitally modulated rf signal to the power amplifier. A second rf signal path through the rf output stage thus includes the VCO, first rf amplifier, digital modulator and power amplifier. Control of the rf signal path is achieved by switchably connecting and disconnecting power to the digital modulator and the second rf amplifier.

20 Claims, 4 Drawing Sheets

DUAL MODE PORTABLE CELLULAR TELEPHONE HAVING SWITCH CONTROL OF THE RF SIGNAL PATH TO EFFECTUATE POWER SAVINGS

BACKGROUND OF THE INVENTION

The present invention relates to cellular telephone systems, and more particularly to a portable, hand-held, cellular telephone having a radio frequency (rf) switch that switches its rf output signal between two rf signal paths in order to achieve a desired type of modulation, and in order to conserve power.

Cellular telephones have been widely used in recent years in automobiles and other mobile vehicles where there has been available an adequate power source to power the operation of the cellular phone. Until quite recently, however, portable cellular telephones (cellular phones that could be removed, carried away from a main power source and operated for both reception and transmission) required the user to also carry a relatively heavy and bulky "battery pack", resembling a large handbag or briefcase. Needless to say, such "portability" left much to be desired.

Within the past couple of years, or so, the hand-held, portable cellular telephone has emerged. A hand-held portable cellular telephone fits comfortably in the hand of a user, may be conveniently carried in a pocket or handbag, and resembles a conventional telephone handset. It includes a mouthpiece or microphone into which the user can speak, and an earpiece or speaker to which the user can listen, while holding the unit in his or her hand. Advantageously, all of the circuitry required for both transmission and reception of cellular telephone signals is included within the housing of the portable cellular telephone, including a battery that is sufficiently small and light weight to allow the hand-held phone to be comfortably held in the user's hand.

Disadvantageously, battery technology has not yet advanced sufficiently to allow a battery of a hand-held portable cellular telephone to power its operation for more than about 10–14 hours when receiving cellular signals, and only about 1 hour or so for transmitting cellular signals. As a result, users of hand-held portable cellular telephones must constantly recharge the battery or batteries of the cellular unit, and/or have replacement batteries readily on hand. There is thus a need in the art for a hand-held cellular telephone that can operate over a longer period of time between battery charges.

One advance that has recently occurred in cellular telephone technology is the availability of various digital modulation schemes that allow more cellular signals (which are modulated radio frequency, or "rf" signals) to be transmitted over the available air waves, or channels, than has previously been possible using conventional FM modulation. Such digital modulation schemes are particularly useful to transfer all of the information needed to track and maintain contact between a portable, or moving, cellular telephone and the nearest stationary transceiver location. However, in order to maintain compatibility with previous (earlier) cellular systems and telephones, there remains a need to retain FM modulation capability. Hence, it is known in the cellular telephone art to provide a dual mode cellular telephone, i.e., one that can selectively operate using a digital modulation scheme or a conventional FM (frequency modulation) scheme.

A dual-mode portable cellular telephone requires, in effect, two rf paths in its output stage, one path for each type of modulation that is available. Having dual rf paths is of little consequence when there are no power constraints or space limitations associated with the cellular telephone because two separate and independent rf channels can be provided internal to the telephone. Unfortunately, a portable hand-held cellular telephone has both power constraints and space limitations, and the use of two independent rf signal paths causes more bulk in the size of the telephone and more power consumption than would otherwise be needed if only one rf signal path were provided. Thus, it would be desirable to have a hand-held, dual mode, portable cellular telephone wherein the need for separate, independent rf paths in the output stage were eliminated.

Many elements included in the rf path through the output stage of a cellular telephone are the same, regardless of the type of modulation that is provided. Such common elements, such as rf amplifiers, attenuators, power amplifiers, and the like, could be shared between both rf signal paths if there were only a convenient way to switch the rf signal path to include the desired type of modulator. Unfortunately, while mechanical rf switches are well known in the art, the reliability of such switches is suspect, making their use unsuitable for a cellular telephone of high reliability. Further, such switches tend to be quite bulky. Hence, there is also a need in the art for a non-mechanical, reliable, rf switch that allows the rf signal path through the output stage of a cellular telephone to be readily toggled to provide one type of modulation or another, as required.

The present invention advantageously addresses the above and other needs.

SUMMARY OF THE INVENTION

The present invention provides a dual mode, portable cellular telephone that utilizes a non-mechanical rf switch to control the rf signal path through its rf output stage, and to effectuate a power savings. A selected type of modulation, e.g., FM or digital, is provided for the rf output signal as a function of the particular rf signal path selected by the rf switch. A voltage controlled oscillator (VCO) generates an rf signal that is selectively modulated with an FM modulation signal. In an FM modulation mode, the rf signal thus generated is amplified by a first rf amplifier and a second rf amplifier, and then applied to a power amplifier. The power amplifier, in turn, couples the amplified rf signal to an antenna for broadcasting. A first rf signal path through the rf output stage thus includes the VCO, first rf amplifier, second rf amplifier, and power amplifier, and the resulting rf output signal is FM modulated. In a digital modulation mode, the rf signal generated by the VCO is unmodulated, having a fixed frequency. This is achieved by making the FM modulation signal be a constant signal. The fixed frequency signal is amplified by the first rf amplifier and then applied to a digital modulator as a local oscillator signal. The digital modulator then modulates the local oscillator signal using appropriate modulation signals, and applies the resulting digitally modulated rf signal to the power amplifier. A second rf signal path through the rf output stage thus includes the VCO, first rf amplifier, digital modulator and power amplifier. Control of the rf signal path is achieved, without the use of any type of mechanical switch, by selectively connecting and disconnecting power to the digital modulator and the second rf amplifier.

One embodiment of the present invention may thus be characterized as an rf switch for use within the rf output stage of a dual mode, portable cellular telephone. Such rf switch selectively controls the rf signal path through the rf output stage so as to provide a selected type of modulation with the rf signal that is transmitted by the rf output stage.

Another embodiment of the invention may be characterized as a dual mode, portable cellular telephone. Such dual mode cellular telephone includes all the conventional elements of any cellular telephone, allowing a user thereof to receive and transmit cellular signals. One aspect of such cellular telephone allows the transmitted rf signal to be digitally modulated or FM modulated. Another aspect of such cellular telephone provides that the rf signal path of the transmitted rf signal may be selectively switched to include a digital modulator or a second rf amplifier. Two rf signal paths are thus provided, each including common elements that are also included in the other signal path. Such common elements include a voltage controlled oscillator connected to a first rf amplifier, and a power amplifier connected to an antenna. A first rf signal path includes all of the above common elements plus a digital modulator connected between the output of the first rf amplifier and the input of the power amplifier. A second rf signal path includes all of the above common elements plus a second rf amplifier connected between the output of the first rf amplifier and the input of the power amplifier. During a digital modulation mode, power is connected to the digital modulator and disconnected from the second rf amplifier. An rf signal from a voltage controlled oscillator, controlled to provide a fixed frequency rf signal, is amplified in the first rf amplifier and modulated by the digital modulator. The resulting digitally modulated signal, amplified by the output power amplifier, is then transmitted through the antenna. During an FM modulation mode, power is disconnected from the digital modulator and connected to the second rf amplifier. The rf signal from the voltage controlled oscillator, controlled to provide an FM signal, is amplified in the first and second amplifiers. The resulting amplified FM signal is further amplified by the output power amplifier and then transmitted through the antenna.

In accordance with yet an additional embodiment, the present invention may be characterized as a method for controlling the rf signal path through an rf output stage of a dual mode portable cellular telephone. The dual mode portable cellular telephone has an FM modulator and a digital modulator that provide modulated signals to an rf power amplifier included within the rf output stage. The method includes the steps of: (a) switchably connecting an output of the FM modulator to the power amplifier when an FM modulation mode is desired; and (b) switchably connecting the output of the FM modulator to a local oscillator terminal of the digital modulator, modulating the FM modulator with a fixed signal so that the output of the FM modulator assumes a constant frequency, and connecting an output of the digital modulator to the power amplifier, when a digital modulation mode is desired.

It is thus a feature of the present invention to provide a dual mode, portable cellular telephone having an rf switch in its rf output stage that selectively controls the rf signal path to provide different types of modulation of the rf output signal.

It is another feature of the invention to provide such a dual mode, portable cellular telephone wherein operation of the rf switch results in a power savings when the telephone is transmitting its rf output signal, thereby increasing the transmit time of the telephone for a given battery charge.

It is yet a further feature of the invention to provide an rf switch for use in the rf output stage of a dual mode portable cellular telephone that electronically controls the rf signal path without the use of mechanical switches or other moving parts.

It is still another feature of the invention to provide such an rf switch that has few parts, is small in size, inexpensive to manufacture, and is reliable in its operation.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
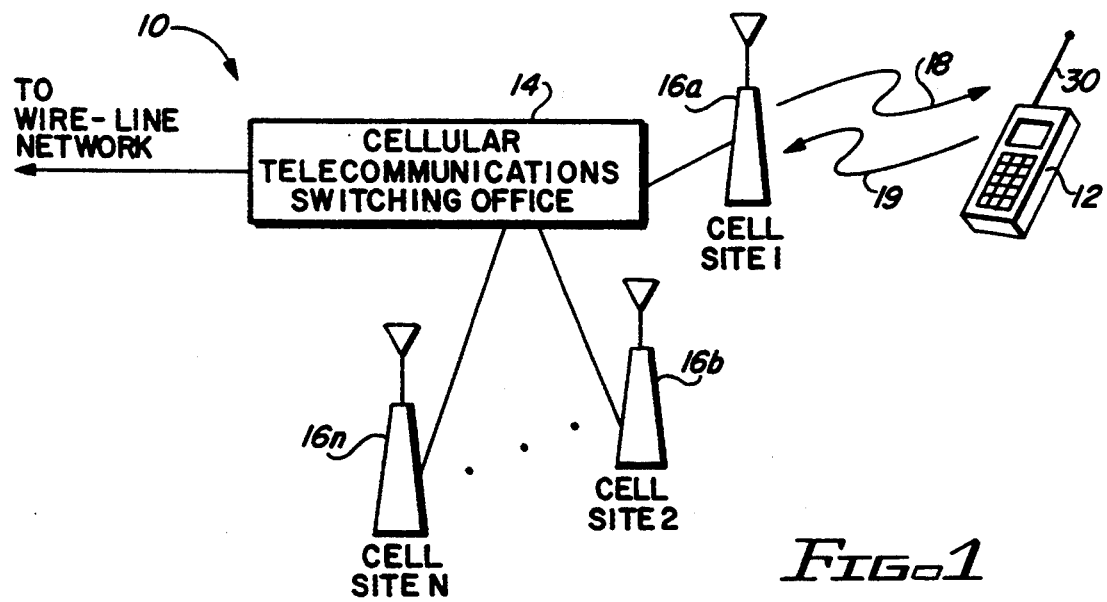
FIG. 1 schematically depicts a cellular telephone system within which a portable, hand-held cellular telephone may be used.

To better understand the present invention, it will first be helpful to briefly review the operation of a cellular telephone system. Hence, reference is first made to FIG. 1, where there is shown a schematic representation of a cellular telephone system 10 within which a portable, hand-held cellular telephone 12 may be used. The system 10 includes a cellular telecommunications switching office 14 connected to a conventional wireline telephone network. The switching office 14 is coupled to a plurality of stationary transceiving stations 16a, 16b, . . . 16n. Each transceiving station is centrally located within a plurality of cell sites. That is, transceiving station 16a is centrally located in a first cell site, cell site 1; transceiving station 16b is centrally located in a second cell site, cell site 2; and so on; with transceiving station 16n being centrally located in an nth cell site, cell site n.

Each transceiving station 16a, 16b, ... 16n periodically transmits a first identifying broadcast signal, represented by the wavy arrow 18, that is picked up through an antenna 30 of each cellular telephone that may be within that particular cell, i.e., within range of the signal 18 broadcast from the transceiving station. The broadcast signal 18 typically identifies, for the cellular telephone 12, certain data or information needed to properly interface with the transceiving station, e.g., the type of modulation being used. Thus, for example, should a user of the cellular telephone 12 want to connect with an identified location, i.e., call a given telephone number, through the wire-line network, the user transmits a cellular signal, represented by the wavy arrow 19, that identifies the particular cellular phone from which the signal originates as well as the telephone number that is being called. The cellular signal 19 is transmitted from the antenna 30 and is modulated appropriately to allow it to be received and processed by the respective transceiving station and cellular telecommunications office. The cellular telecommunications office effectuates the connection with the indicated telephone number and thereby establishes a two-way communication link between the called number and the cellular telephone.

Should the cellular telephone 12 move from one cell site to another, the cellular telecommunication switching office is able to transfer the appropriate signals to the transceiving station of the next cell site with minimal interruption in the performance or operation of the cellular telephone 12. In this manner, then, the cellular telephone 12 may operate and communicate with the cellular telecommunications switching office 14 from any location within any of the cell sites, thereby permitting a user of the cellular telephone 12 to both receive and transmit calls over a wide area.

Figure 2:
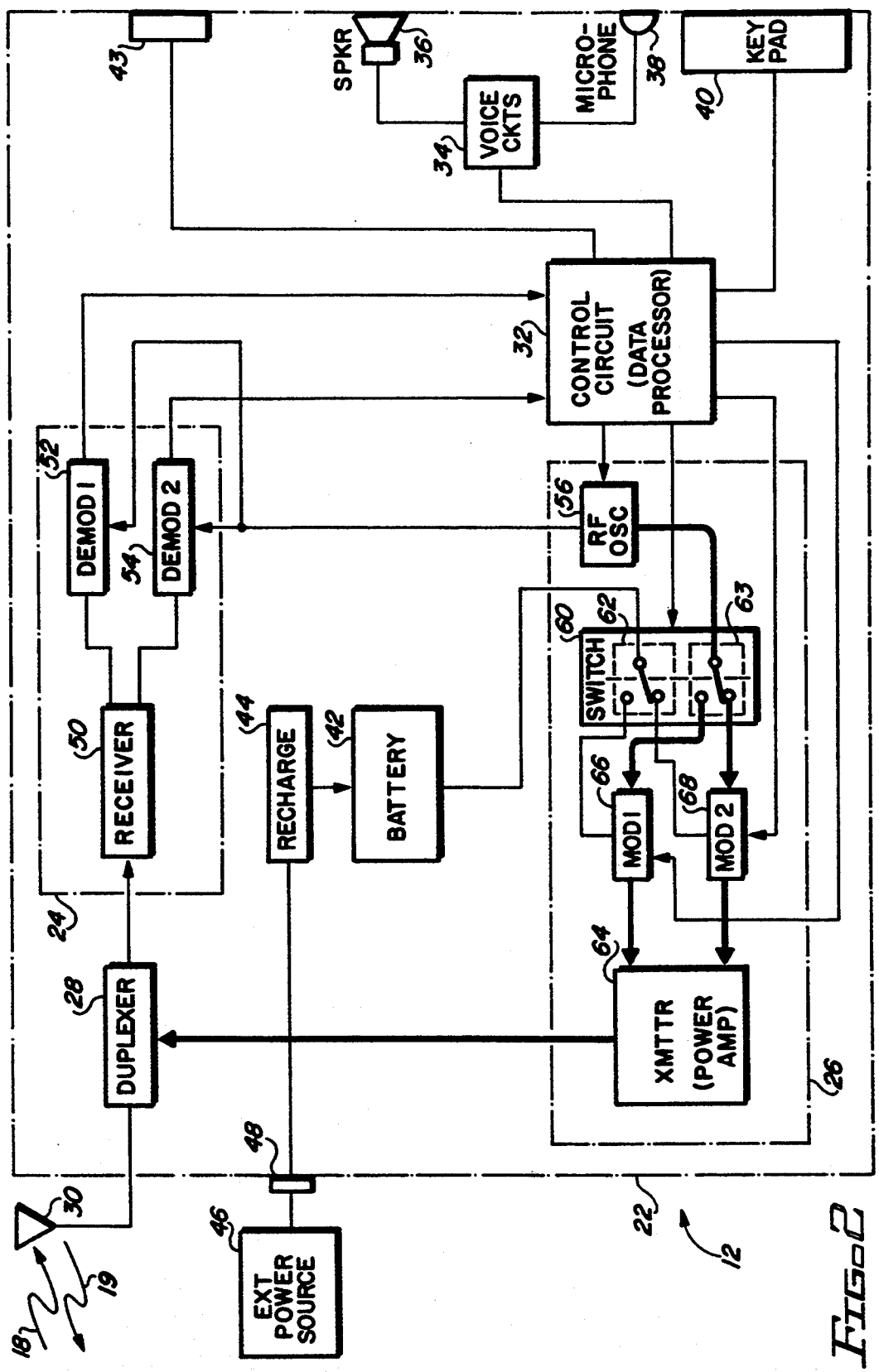
FIG. 2 is a block diagram of dual mode, portable, cellular telephone.

Referring next to FIG. 2, a simplified block diagram of a dual mode, portable, cellular telephone 12 made in accordance with the present invention is shown. The cellular telephone 12 includes a suitable housing 22 adapted for being held in the hand of a user. The antenna 30 is connected to the housing 22, and may typically be extended from the housing as needed, in conventional manner. The antenna 30 is electrically connected to a duplexer circuit 28. The duplexer circuit 28 permits the antenna to be used as both a receiving antenna, when an incoming signal 18 is being received, and as a broadcasting or transmitting antenna, when an outgoing signal 19 is being transmitted.

The duplexer circuit 28 routes incoming signals 18 to an rf input stage 24. The rf input stage includes a receiver 50 and a first demodulator circuit 52 and a second demodulator circuit 54. Two demodulator circuits are required to handle the dual modulation schemes that may be employed, e.g., digital modulation and FM modulation, within the incoming signal. An rf oscillator 56 provides appropriate local oscillator signals for use by the demodulators 52 and 54 as they perform their respective demodulator functions, in conventional manner.

The demodulated signals are routed to an appropriate control circuit 32, which typically includes a data processor, e.g., a microprocessor, including memory. The control circuit 32 determines the type of incoming signal that has been received, and takes appropriate action in response thereto. If the incoming signal is a voice signal, then it is directed to appropriate voice circuits 34 and processed for being heard through a speaker 36. If the incoming signal is an informational signal, i.e., one that identifies some aspect of the signal protocol that must be used to maintain proper contact with the transceiver station from which the incoming signal 18 originates, then the needed information is used to thereafter control the operation of the telephone 12 in the correct manner.

The cellular telephone 12 also includes an rf output stage 26. The rf output stage is used when transmitting signals 19 from the antenna 30 of the cellular phone. (Note, throughout this application, the terms "telephone" and "phone" are used synonymously.) The rf output stage includes the rf oscillator 56, a switch 60, first and second modulators 66 and 68, and a transmitter (rf power amplifier) 64. The rf oscillator 56 generates an rf signal. The rf signal is applied to an rf signal path 61. Note that the rf signal path 61, and all other rf signal paths in FIG. 2, are shown as a heavy or bold line.

The rf signal path 61 connects with a switch 60. As illustrated in FIG. 2, the switch 60 includes dual switches: an rf switch 63 that connects the rf signal path to either a first modulator 66 or a second modulator 68; and a power switch 62 that selectively connects operating power obtained from a battery 42 to either the first modulator 66 or the second modulator 68. Operation of the switch 60 is controlled by the control circuit 32 so that the rf signal path is connected through the rf switch 63 to either the first modulator 66 or the second modulator 68 at the same time that power is connected or disconnected, respectively, to the first modulator 66 or the second modulator 68. The rf output of both modulators is then applied to the transmitter circuit 64, and the output of the transmitter circuit 64 is coupled through the duplexer 28 to the antenna 30.

The transmitted rf signal is modulated by one of the modulators 66 or 68 to contain appropriate information. When transmitting a voice signal, for example, a microphone 38, mounted in the housing 22, couples a sensed voice signal to the voice circuits 34. The voice signals thus received and then processed by the control circuit 32 and applied to one of the modulators 66 or 68 as a modulation signal. When transmitting a data signal, such as the telephone number of the cellular phone 12, such data signals are generated within the control circuit 32 (or retrieved from a memory circuit that forms part of the control circuit 32) and applied to an appropriate one of the modulators 66 or 68 as a modulation signal. When the user of the cellular phone 12 is calling another telephone number, the number being called is keyed into a keypad 40 also located on the housing 22. The keyed-in number is then processed by the control circuit 32 and thereafter modulates one of the modulators 66 or 68. Through use of the keypad 40, or through use of a data interface 43, the user may thus transmit whatever data signals are desired over the cellular phone. The data interface 43, for example, may be connected to a fax machine or a computer.

Many cellular telephones will also include a battery recharge circuit 44 that allows the battery 42 to be recharged through a power connector 48 that is coupled to a suitable external power source, e.g., the battery of an automobile, or a 110 Hz ac power line. Other cellular telephones simply provide for the easy removal of the battery 42 from the housing 22 so that the battery can be quickly recharged using an external battery charging circuit.

It is noted that with the exception of the rf output stage 26, and in particular the switch 60 used therein, all of the circuits shown in FIG. 2 may be of conventional design as is known in the art. That is, the present invention deals with control of the rf signal path through the rf output stage 26 and through such control achieving a desired modulation, and power savings.

Figure 3:
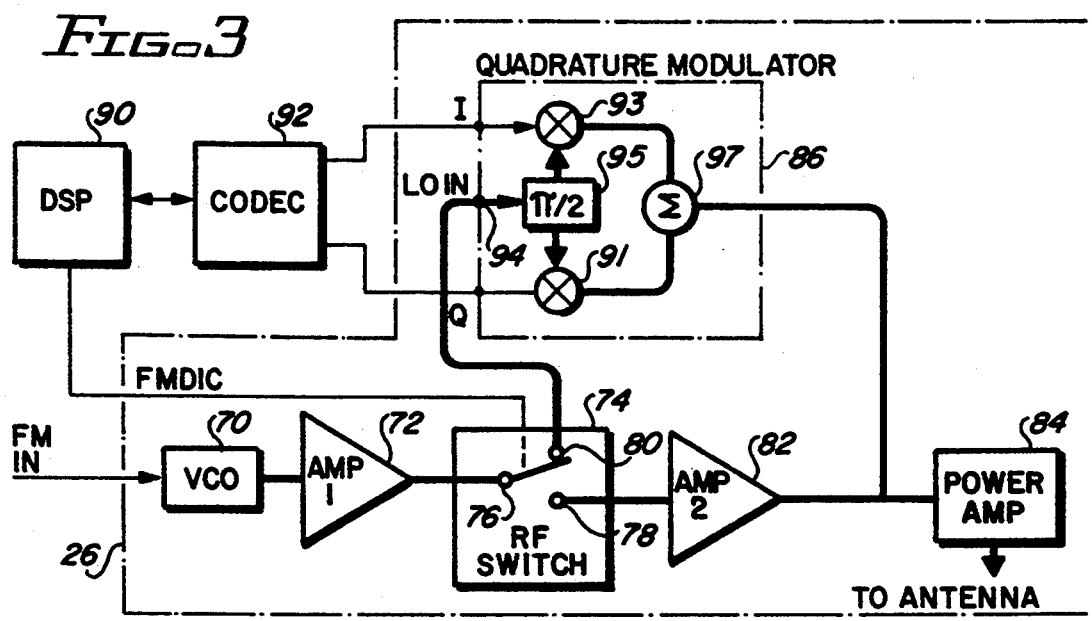
FIG. 3 is a block diagram of a preferred rf output stage of a portable, cellular telephone made in accordance with the present invention, and shows how the use of an rf switch within the output stage controls the rf signal path through such output stage.

Turning next to FIG. 3, there is shown a functional block diagram of a preferred rf output stage 26 of a portable, cellular telephone 12 made in accordance with the present invention. As with FIG. 2, the rf signal paths through the output stage 26 are shown in bold or thick lines. As seen in FIG. 3, the RF signal path begins with a voltage controlled oscillator (VCO) 70 that generates an rf signal. The frequency of the rf signal is modulated as a function of an FM input signal, identified as "FM In" in FIG. 3. The output of the VCO 70 is then coupled to an input terminal 76 of an rf switch 74. A first rf output terminal 80 of the switch 74 connects the RF path to a local oscillator (LO) input port 94 of a suitable digital modulator 86. A preferred digital modulator 86 for use with the present invention is a quadrature modulator. The quadrature modulator modulates the rf signal received at the input port 94 using a phase shifter 95, two mixer circuits 91 and 93, and an in-phase combiner 97, in accordance with a time-division multiple access (TDMA) scheme, as controlled by two modulation signals, labeled I and Q. The I and Q modulation signals are obtained from a coder/decoder (CODEC) circuit 92, which is coupled to a digital signal processor (DSP) 90. The use of a quadrature modulator circuit to provide TDMA modulation is known in the art. See, e.g., "Recommended Minimum Performance Standards for 800 MHz Dual Mode Mobile Stations", published by the Telecommunications Industry Association (TIA), document number IS-55-A.

It is noted that other forms of digital modulation may also be provided by the digital modulator 86, such as code-division multiple access (CDMA) modulation, as is known in the art.

A second output terminal 78 of the rf switch 74 connects the rf signal path to the input of a second rf amplifier 82. The output of the second rf amplifier 82, as well as the output of the quadrature modulator 86, connects the rf signal path to the power amplifier 84. The power amplifier, in turn, connects the rf signal amplified by the power amplifier to the antenna.

The DSP 90 controls the rf switch 74 so as to connect the input terminal 76 to either the output terminal 78 or the output terminal 90. A control signal, labeled FMDIG (FM or Digital Control) generated by the DSP 90 is used to provide such control. Thus, the rf switch 74 directs the rf signal path to either the input port 94 of the modulator 86, or to the input of the second rf amplifier 82.

Two modes of operation are provided by the output stage as shown in FIG. 3. In a first or FM mode, the rf switch is configured to connect the input terminal 76 with the output terminal 78. The "FM In" signal modulates the VCO to provide FM modulation of the rf signal, and this signal is amplified by the first rf amplifier 72, the second rf amplifier 82, and the power amplifier 84. During the FM mode, the rf signal path through the output stage thus includes the VCO 70, the first and second rf amplifiers 72 and 82, and the power amplifier 84.

In a second or TDMA mode, the rf switch is configured to connect the input terminal 76 with the output terminal 78. The "FM In" signal is held constant, e.g., by grounding it, so that the output of the VCO is an rf signal having a constant frequency. This constant frequency rf signal is amplified by the first rf amplifier 72, and then directed to the "LO In" port 94 of the quadrature modulator 86. The quadrature modulator 86 digitally modulates the rf signal as controlled by the I and Q modulation signals, producing the desired TDMA modulation. The resulting TDMA modulated signal is then applied to the power amplifier 84, which couples it to the antenna. During the TDMA mode, the rf signal path through the output stage 86 thus includes the VCO 70, the first rf amplifier 72, the quadrature modulator 86, and the power amplifier 84.

The rf switch 74 is functionally depicted in FIG. 3 as a switch device that has an armature or wiper that physically connects the input terminal 76 to either the output terminal 78 or the output terminal 80. Indeed, a mechanical rf switch having a movable armature that functions as shown in FIG. 3 could be used to provide the switching of the rf signal path as described above. However, mechanical rf switches are prone to failure, and do not necessarily provide the switching speed needed in a dual mode portable cellular phone (where it is often necessary to rapidly switch from one modulation mode to the other). Hence, the preferred embodiment of the present invention utilizes an electronic rf switch with no moving parts, as depicted in the block diagram of the output stage shown in FIG. 4.

Figure 4:
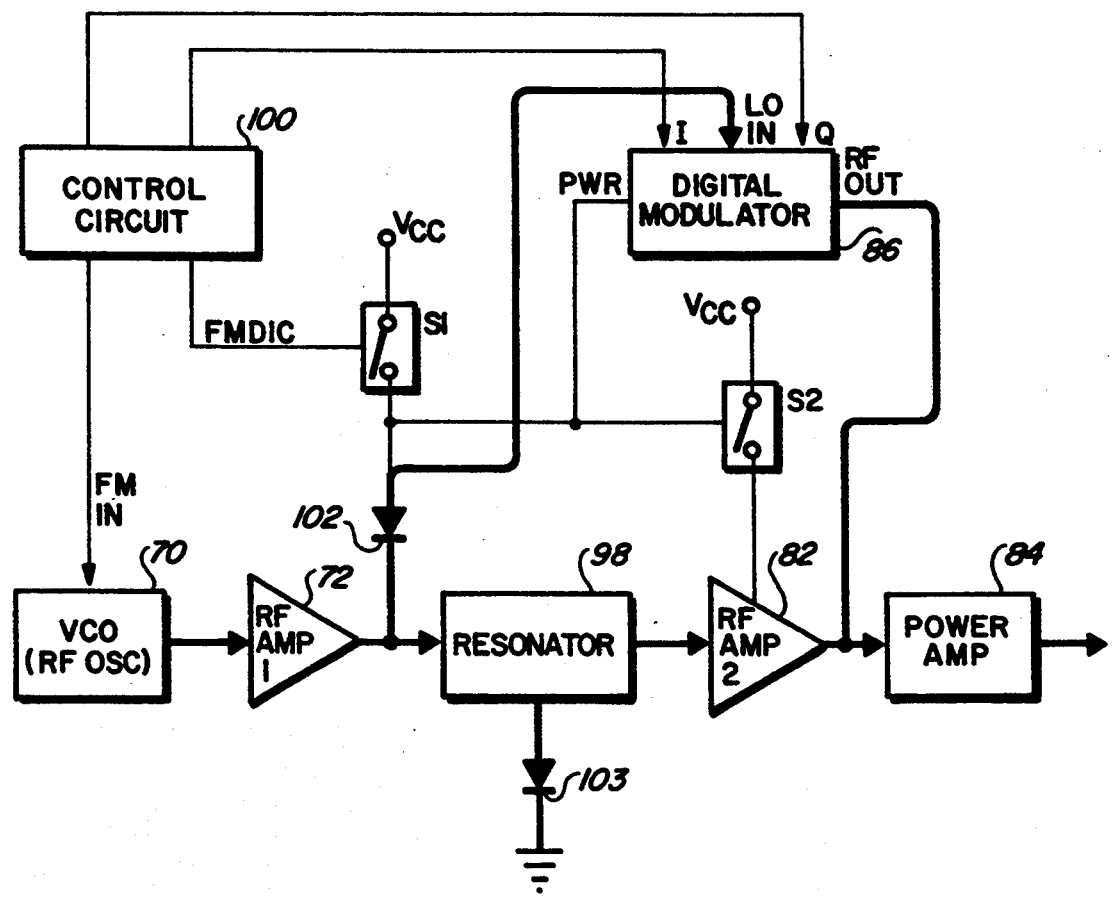
FIG. 4 is a block diagram that depicts how the rf switch of the present invention is electronically realized.

The output stage of FIG. 4 is the same as the output stage of FIG. 3 except that the rf switch 74 of FIG. 3 has been replaced in FIG. 4 with two solid state switches S1 and S2, a resonator 98, a diode 102, and a diode 103. The control circuit 100 shown in FIG. 4 includes the DSP 90, CODEC 92 of FIG. 3, plus any other "FM In" generater circuits that may be required to generate the "FM In" signal used to modulate the VCO 70. The solid state switch S1 switchably connects the operating voltage, $V_{cc}$, to a power terminal of the modulator 86. The switch S1 is further connected to solid state switch S2 so that when switch S1 is closed, i.e., when $V_{cc}$ is applied to the modulator 86, switch S2 is open, and disconnects $V_{cc}$ from the second rf amplifier 82. Similarly, when switch S1 is open, i.e., when $V_{cc}$ is disconnected from the modulator 86, switch S2 is closed, and connects $V_{cc}$ to the second rf amplifier 82. In this way, power ($V_{cc}$) is either applied to the modulator 86 or to the second rf amplifier 82, but not to both. Thus, only one of the modulator 86 or second rf amplifier 82 is operational at any given time, as controlled by switch S1. Switch S1, in turn, is controlled by the FMDIG signal generated by the control circuit.

The resonator 98 is connected between the output of the first rf amplifier 72 and the input of the second rf amplifier 82. The diode 102 is included in the rf signal path that connects the output of the first rf amplifier 72 to the input port of the modulator 86. When switch S1 is closed, connecting $V_{cc}$ to the modulator circuit 86, the diode 102 is forward biased and permits the rf signal to pass therethrough with low attenuation. The diode 103 is also forward biased at the same time as diode 102 is forward biased, and thus creates an rf short at the end of the resonator 98 near the input of the second rf amplifier 82. Such rf short thus creates a high impedance for the rf path from rf amplifier 72 to rf amplifier 82, thus isolating the rf path to the second rf amplifier 82. When switch S1 is open, disconnecting $V_{cc}$ from the modulator circuit 86, the diode 102 is biased with a much lower current, causing any rf signal that attempts to pass therethrough to be significantly attenuated. The diode 103 is similarly biased, creating a high impedance that causes the resonator to appear as a low attenuation path between the first rf amplifier 72 and the second rf amplifier 82.

Thus, when switch S1 is closed, the digital modulator 86 is turned ON (because $V_{cc}$ is applied thereto), and switch S2 is open, causing the second rf amplifier to be turned OFF (because $V_{cc}$ is disconnected therefrom). In this state, the rf signal path cannot pass through the resonator 98 or the amplifier 82. However, the diode 102 is forward biased, and an rf signal path is made available to the input port of the turned ON digital modulator 86. The digital modulator 86 thus modulates the rf signal, and the resulting digitally modulated signal is coupled to the antenna through the power amplifier 84.

When switch S2 is open, the digital modulator 86 is turned OFF (because $V_{cc}$ is disconnected therefrom), and switch S2 is closed, causing the second rf amplifier to be turned ON (because $V_{cc}$ is connected thereto). In this state, the rf signal path readily passes through amplifier 82, but not through the diode 102 (because it is biased to provide a much higher impedance). Moreover, any rf signal that does make it through the diode 102 is not modulated by the modulator 86, because the modulator 86 is turned OFF. While in this state, the "FM In" signal modulates the VCO 70, providing an FM signal that is coupled to the antenna, after being amplified by the first rf amplifier 72 and the second rf amplifier 82, through the power amplifier 84.

Figure 5A:
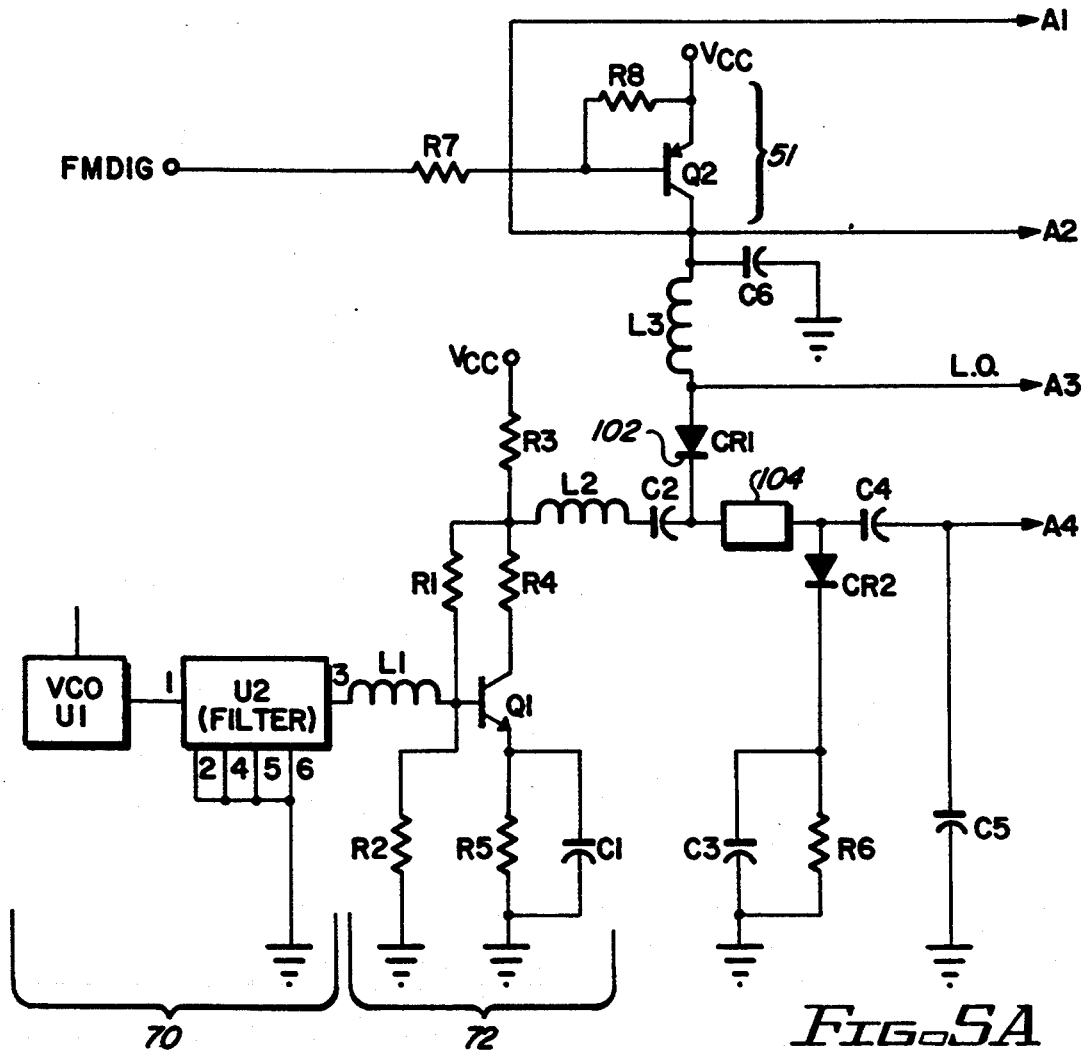
FIGS. 5A and 5B show a schematic diagram of an rf switch made in accordance with the present invention.
Figure 5B:
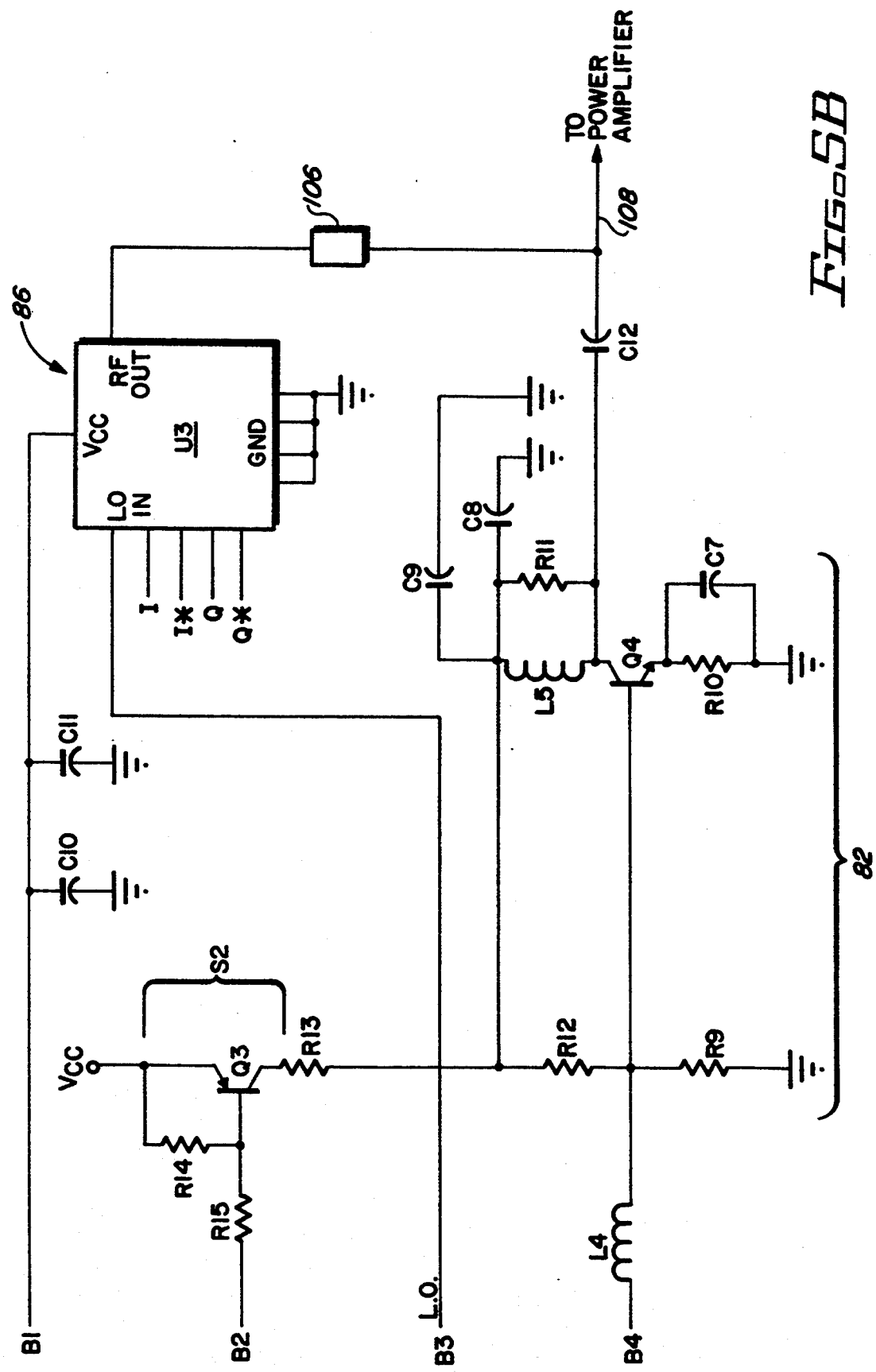

Turning next to FIGS. 5A and 5B, there is shown a schematic diagram of a preferred output stage, including rf switch, for use within a dual mode portable cellular phone in accordance with the present invention. FIGS. 5A and 5B are the same schematic diagram, with the left half of the diagram appearing on FIG. 5A, and the right half appearing on FIG. 5B. Interconnection lines between the two halves, i.e., between FIG. 5A and FIG. 5B, are labeled with corresponding numbers and letters. That is, connection line A1 in FIG. 5A interconnects with line B1 in FIG. 5B; line A2 in FIG. 5A interconnects with line B2 in FIG. 5B; line A3 in FIG. 5A interconnects with line B3 in FIG. 5B; and line A4 in FIG. 5A interconnects with line B4 in FIG. 5B.

The schematic diagram shown in FIGS. 5A and 5B parallels the block diagram shown in FIG. 4. Hence, the previous description given above in connection with FIG. 4 relative to the operation of the rf output stage applies equally well to the schematic diagram in FIGS. 5A and 5B.

With reference to FIG. 5A, VCO 70 includes a VCO module U1 and a filter integrated circuit (IC) U2. In the preferred embodiment, the VCO module U1 has a center frequency of 836.5 MHz and a frequency range of $\pm 12.5$ MHz, and is frequency modulated at a rate up to approximately $\pm 14$ KHz as a function of the control voltage TXLO (which control voltage TXLO comprises the same control signal as that labeled "FM In" in FIG. 4). The VCO module U1 may be realized using any of a number of commercially available modules, such as the 93000347 available from MURATA/ERIE. The filter module U2 is of conventional design, and is selected to pass the output signal generated by the VCO U1.

The first rf amplifier 72 is realized using rf transistor Q1, connected in circuit configuration with the discrete resistors R1–R5, inductors L1 and L2, and capacitor C1, as shown. The transistor Q1 may be realized using an NPN rf transistor available from numerous semiconductor vendors, such as the NEC68030.

The capacitor C2, which connects the inductor L2 to the anode of diode CR1, functions as a coupling capacitor. (The diode CR1 functions as the diode 102 in FIG. 4.) Also connected to the coupling capacitor is a quarter-wavelength trace 104. (Quarter wavelength trace 104 functions as the resonator 98 in FIG. 4.) On the other side of the quarter-wavelength trace 104 is the cathode of another diode CR2, with the anode of diode CR2 being connected to signal ground through a resistor R6 in parallel with a capacitor C3. (The diode CR2 functions as the diode 103 in FIG. 4.) The diode CR2 and resistor R6 provide a current path for the bias current that flows through the diode CR1 when such diode is forward biased by the closing of switch S1. Capacitor C4 is another coupling capacitor that connects the rf signal path through the quarter-wavelength trace to the input of the second rf amplifier 82, via connection lines A4–B4, described below.

The solid state switch S1 is realized with PNP transistor Q2 having its emitter terminal tied to $V_{cc}$, and its collector terminal tied to one side of inductor L3. A capacitor C6 also connects this collector terminal to ground. The collector terminal is also connected to interconnection line A2-B2, which connects with switch S2, described below in connection with FIG. 5B, and to interconnection line A1-B1, which connects with the $V_{cc}$ terminal of the digital modulator 85. The other side of the tank circuit 98 is tied through interconnection line A3-B3 to the local oscillator input port of modulator 86. Tank circuit 98 is realized with the parallel combination of inductor L3 and capacitor C6.

Still describing the solid state switch S1, realized with transistor Q2, the base of transistor Q2 is connected to bias resistors R7 and R8, and is further tied to the FMDIG control line. When the FMDIG line goes low, Q2 turns ON, applying $V_{cc}$ to the modulator 85 and to the base of transistor Q3 (switch S2, in FIG. 5B), thereby allowing a sufficient bias current to flow through diodes CR1, CR2 and resistor R6 to maintain diodes CR1 and CR2 in a forward biased condition. When the FMDIG line goes high, Q2 turns OFF, disconnecting $V_{cc}$ from the modulator 85 and the base of transistor Q3, which action also significantly decreases the bias current flow through diodes CR1 and CR2, effectively turning them off.

Switch S2 (FIG. 5B) is realized with PNP transistor Q3. The emitter of transistor Q3 is connected to $V_{cc}$. The base of transistor Q3 is connected to bias resistors R14 and R15 and is coupled, through R15, to the interconnection line B2. Thus, when transistor Q2 (FIG. 5A) is ON, the base of transistor Q3 is pulled up to $V_{cc}$, keeping transistor Q3 turned OFF. As soon as transistor Q2 is turned OFF, then the base of transistor Q3 is pulled sufficiently low through R14, R15 and the interconnection line B2, to turn Q3 ON. Turning Q3 ON, in turn, applies $V_{cc}$ through resistor R13 (connected to the collector of Q3) to the second rf amplifier 82.

Both transistors Q2 and Q3 may be realized with a 2SA1577P transistor, commercially available from numerous semiconductor manufacturers, such as Motorola.

The rf amplifier 82 is made from rf transistor Q4, connected in circuit relationship with inductors L4 and L5, resistors R9, R10, R11, R12, and capacitors C7, C8 and C9, as shown in FIG. 5B. The transistor Q4 may also be a NE68030. The output of rf amplifier 82, at the collector of transistor Q4, is coupled through coupling capacitor C12 to signal line 108, which is directed to the input of the power amplifier.

Still referring to FIG. 5B, the digital modulator 86 is realized using an IC chip U3, a quadrature modulator which may be obtained commercially from numerous semiconductor manufacturers, such as Telefunken Electronic, as quadrature modulator U2790B-AFP. The "RF Out" port of such device is connected through a quarter wavelength trace 106 to the signal line 108, which is directed to the input of the power amplifier.

Advantageously, using the output stage as shown in FIGS. 4 and 5A-5B, the present invention is able to provide an electronic rf switch that switches the rf signal path between a first rf path that includes a digital modulator and a second rf path that does not include the digital modulator. Further, by switching off the power to the digital modulator when the modulator is not being used, and by switching off the power to the second rf amplifier when it is not being used, approximately 40 ma of current is saved. This current savings translates to an increase of about 10-15% in the use time of the cellular phone's battery between charges.

While the invention herein disclosed has been described by means of specific embodiments and applications thereof, numerous modifications and variations could be made thereto by those skilled in the art without departing from the scope of the invention set forth in the claims.

What is claimed is:

1. A radio frequency (rf) switch for use within a dual mode portable cellular phone, said cellular phone having an rf output stage that includes a local oscillator that generates an rf signal having a frequency that varies as controlled by a first control signal, first and second modulators that modulate said rf signal in accordance with different modulation schemes, a power amplifier that amplifies the output signals of said first and second modulators, and a control circuit that controls the operation of the cellular telephone, and that generates a selection signal for designating which of said first and second modulators are to be used to modulate said rf signal, said rf switch comprising:
    an rf switch circuit controlled by said selection signal, said rf switch circuit having an input port and first and second output ports, said rf switch circuit establishing a first rf signal path between the input port and the first output port whenever the selection signal assumes a first state, and said rf switch circuit establishing a second rf signal path between the input port and the second output port whenever the selection signal assumes a second state;
    a first rf connection that connects the first output port of the rf switch to an rf input port of said first modulator;
    a second rf connection that connects the second output port of the rf switch to an rf input port of the second modulator;
    a third rf connection that connects an rf output port of said first modulator to an rf output port of said second modulator and to an rf input terminal of said power amplifier;
    whereby an rf signal path through the rf output stage of said cellular telephone passes through one of said first modulator or said second modulator as controlled by said selection signal;
    whereby differing modulation schemes are used by said cellular telephone as controlled by said selection signal.

2. The cellular phone radio frequency switch as set forth in claim 1 wherein said rf switch circuit further includes:
    a first rf amplifier;
    a second rf amplifier;
    each of said first and second rf amplifiers having an input and an output terminal, with the input terminal of said first rf amplifier being connected to said local oscillator, and the output terminal of said first rf amplifier being coupled to: (1) the rf input port of the first modulator through a diode, and (2) the input terminal of the second rf amplifier; and
    control means responsive to said selection signal for biasing said diode in a forward direction and turning said second rf amplifier OFF when said selection signal assumes its first state, and for biasing said diode in an OFF state and turning said second rf amplifier ON when said selection signal assumes its second state.

3. The cellular phone radio frequency switch as set forth in claim 2 wherein said control means includes:
    a first transistor switch coupled to the output terminal of said first rf amplifier, and controlled by said selection signal, said first transistor switch being biased to turn ON when said selection signal assumes its first state, and to turn OFF when said selection signal assumes its second state, said first transistor switch being connected to a voltage source that biases said diode in a forward direction when said first transistor switch is ON, and that biases said diode OFF when said first transistor switch is OFF; and
    a second transistor switch coupled to said first transistor switch that turns ON when said first transistor switch turns OFF, and turns OFF when said first transistor switch turns ON, said second transistor switch being connected in circuit relationship with said second rf amplifier to turn said second rf amplifier ON only when said second transistor switch is ON, whereby said second rf amplifier is OFF when said first transistor switch is ON, and is ON when said first transistor switch is OFF.

4. The cellular phone radio frequency switch as set forth in claim 3 wherein said first transistor switch is further connected to a power input terminal of said first modulator and connects said voltage source to said power input terminal when said first transistor switch is ON, and disconnects said voltage source from said power input terminal when said first transistor switch is OFF, whereby said voltage source is selectively connected to said first modulator as controlled by said selection signal.

5. In a dual mode, portable cellular telephone having a radio frequency (rf) output stage that includes a power amplifier coupled to an antenna for transmitting an rf output signal modulated in accordance with a selected one of two modulation schemes, an rf switch that controls the rf signal path through the rf output stage, said rf switch comprising:
    a voltage controlled oscillator (VCO) that generates an FM modulated rf signal as a function of a first modulation signal;
    a first rf amplifier having an input terminal and an output terminal, the input terminal being coupled to said VCO, whereby the first rf amplifier amplifies said FM modulated rf signal;

a second rf amplifier having an input terminal and an output terminal, the input terminal of the second rf amplifier being coupled to the output terminal of the first rf amplifier, and the output terminal of the second rf amplifier being coupled to said power amplifier, whereby the second rf amplifier further amplifies the FM modulated rf signal amplified by the first rf amplifier, and presents the signal thus amplified to said power amplifier;

a digital modulator having a local oscillator input port and an rf output port, said digital modulator comprising circuits that modulate a local oscillator signal applied to the local oscillator input port as a function of a second modulation signal, and apply the local oscillator signal thus modulated to the rf output port, the rf output port of said digital modulator being coupled to said power amplifier, and the local oscillator input port being coupled to the output terminal of said first rf amplifier;

a first switch that selectively connects a power source to a selected one of said digital modulator or said second rf amplifier, while disconnecting the power source from the other of said digital modulator or second rf amplifier; and a control circuit that operates said first switch and generates said first and second modulation signals;

said control circuit setting said first modulation signal to a constant value, thereby controlling the VCO to output a fixed frequency rf signal, and setting said second modulation signal to define a desired modulation for the rf output signal, whenever said first switch connects power to said digital modulator and disconnects power from said second rf amplifier;

said control circuit setting said first modulation signal to define the desired modulation for the rf output signal whenever said first switch disconnects power from said digital modulator and connects power to said second rf amplifier;

whereby the rf signal path through said output stage includes said VCO, first rf amplifier, digital modulator and power amplifier when said first switch connects power to said digital modulator and disconnects power from said second rf amplifier, thereby providing digital modulation of the rf output signal, and further whereby the rf signal path through said output stage includes said VCO, first rf amplifier, second rf amplifier and power amplifier when said first switch disconnects power from said digital modulator and connects power to said second rf amplifier, thereby providing FM modulation of the rf output signal.

6. The rf switch for use in a dual mode portable cellular telephone as set forth in claim 5 wherein said rf switch further includes a diode connected between the rf output terminal of the first rf amplifier and said first switch, and wherein a bias current is made to flow through said diode whenever said first switch connects power to said digital modulator and disconnects power from said second rf amplifier that maintains said diode in a forward biased condition, and wherein substantially no bias current flows through said diode, and hence said diode is biased in an OFF condition, whenever said first switch disconnects power from said digital modulator and connects power to said second rf amplifier.

7. The rf switch for use in a dual mode portable cellular telephone as set forth in claim 5 wherein said first switch comprises a first transistor switch and a second transistor switch, said first transistor switch being controlled by said control circuit so as to selectively apply the power source to said digital modulator, said first transistor switch further controlling said second transistor switch to connect and disconnect power to said second rf amplifier only when said first transistor switch disconnects and connects power, respectively, from said digital modulator, whereby only one of said digital modulator or said second rf amplifier have power applied thereto at any given time.

8. The rf switch for use in a dual mode portable cellular telephone as set forth in claim 7 wherein said digital modulator comprises a time-division multiple access (TDMA) modulator.

9. The rf switch for use in a dual mode portable cellular telephone as set forth in claim 7 wherein said digital modulator comprises a code-division multiple access (CDMA) modulator.

10. A dual mode, portable cellular telephone comprising:

an rf input stage including a receiver coupled to a plurality of demodulation circuits;

an rf output stage including an rf oscillator, a switch, a plurality of modulators, and a power amplifier, said rf switch connecting an rf signal path originating at said rf oscillator with a selected one of said plurality of modulators, each of said plurality of modulators being connected to said power amplifier, whereby a plurality of rf signal paths are provided through said rf output stage as a function of said rf switch;

duplexer means for connecting said rf input stage to an antenna for incoming rf signals, and for connecting said rf output stage to said antenna for outgoing rf signals;

control means for determining, based on identification data included in the incoming rf signals received through said rf input stage, which of said plurality of rf signal paths are used by said rf output stage at any given time, and for including in said outgoing rf signals appropriate identification data and voice information;

voice means coupled to said control means for converting selected voice information included within said incoming rf signal to an audio signal that can be heard by a user of said cellular telephone, and for converting words spoken by said user to voice information that modulates the outgoing rf signal using one of said plurality of modulators; and a battery that provides electrical operating power for said cellular telephone from electrical energy stored therein.

11. The dual mode, portable, cellular telephone as set forth in claim 10 wherein said rf switch includes means for selectively connecting said battery to at least one modulator of said plurality of modulators only when the rf signal path includes said at least one modulator, whereby electrical power is not applied to the at least one modulator when the rf signal path does not include said at least one modulator, thereby saving electrical power.

12. The dual mode, portable, cellular telephone as set forth in claim 11 wherein a first modulator of said plurality of modulators comprises a frequency modulation (FM) modulator, and a second modulator of said plurality of modulators comprises a digital modulator.

13. The dual mode, portable, cellular telephone as set forth in claim 12 wherein
   said rf oscillator comprises a voltage controlled oscillator (VCO) that generates an oscillator output signal having a frequency, centered about a center frequency $f_0$, controlled by an FM modulation signal received from said control means, and wherein
   said digital modulator includes a local oscillator rf input port that receives an rf carrier signal, and at least one modulation input port that receives a digital modulation signal generated by said control means; and further wherein
   said rf switch connects said VCO to said power amplifier whenever said rf switch assumes a first position, thereby providing FM modulation of the oscillator output signal as modulated by said FM modulation signal, and
   said rf switch connects said VCO to the local oscillator rf input port of said digital modulator when said rf switch assumes a second position, and said control means locks the FM modulation signal to a constant value, whereby said oscillator output signal assumes a fixed frequency, thereby providing digital modulation of the fixed frequency oscillator output signal as modulated by said digital modulation signal;
   whereby FM modulation of the output signals transmitted by said cellular telephone is provided when said rf switch assumes its first position, with the rf signal path through said rf output stage including said VCO, rf switch and power amplifier; and further
   whereby digital modulation of the output signals transmitted by said cellular telephone is provided when said rf switch assumes its second position, with the rf signal path through said rf output stage including said VCO, rf switch, digital modulator and power amplifier.

14. The dual mode, portable, cellular telephone as set forth in claim 13 wherein said digital modulator comprises a time-division multiple access (TDMA) modulator.

15. The dual mode, portable, cellular telephone as set forth in claim 13 wherein said digital modulator comprises a code-division multiple access (CDMA) modulator.

16. The dual mode, portable, cellular telephone as set forth in claim 13 wherein said rf switch includes
   a first rf amplifier,
   a second rf amplifier, and
   a switching circuit, said switching circuit having an input node and first and second output nodes, a first rf path being provided between said input node and said first output node when said rf switch assumes its first position, and a second rf path being provided between said input node and said second output node when said rf switch assumes its second position,
   said first rf amplifier being interposed in the rf signal path between said VCO and the input node of said switching circuit, and
   said second rf amplifier being interposed in the rf signal path between the second output node of the switching circuit and the power amplifier, and
   said digital modulator being interposed in the rf signal path between the first output node of the switching circuit and the power amplifier,
   whereby the rf signal path through said output stage includes said VCO, first rf amplifier, input and first output nodes of said switching circuit, digital modulator and said power amplifier when said rf switch assumes its first position; and
   whereby the rf signal path through said output stage includes said VCO, first rf amplifier, input and second output nodes of said switching circuit, second rf amplifier, and power amplifier when said rf switch assumes its second position.

17. The dual mode, portable, cellular telephone as set forth in claim 16 wherein
   said first rf amplifier includes a first rf transistor,
   said second rf amplifier includes a second rf transistor,
   an output terminal of said first rf transistor is coupled in circuit relationship with the local oscillator rf input port of said digital modulator and with an input terminal of said second rf transistor, and
   said switching network includes a pair of transistors connected to bias said second rf transistor so that it is OFF, and to apply power to said digital modulator, whenever said rf switch assumes its first position, and to bias said second rf transistor so that it is ON, and to apply power to said digital modulator, whenever said rf switch assumes its second position,
   whereby, when said rf switch assumes its first position, any rf signal appearing at the output terminal of the first rf transistor is prevented from being amplified by said second rf transistor, which is biased OFF, and is received and modulated by the digital modulator, which has power applied thereto, and
   whereby, when said rf switch assumes its second position, any rf signal appearing at the output terminal of the first rf transistor is amplified by the second rf transistor, which is biased ON, and is not received nor modulated by the digital modulator, which has no power applied thereto.

18. A method for controlling the rf signal path through an rf output stage of a dual mode portable cellular telephone, said dual mode portable cellular telephone having an FM modulator and a digital modulator that provide modulated signals to an rf power amplifier included within said rf output stage, said method comprising the steps of:
   (a) switchably connecting an output of the FM modulator to said power amplifier through a first rf signal path when an FM modulation mode is desired; and
   (b) switchably connecting the output of the FM modulator to a local oscillator terminal of said digital modulator through a second rf signal path, modulating said FM modulator with a fixed signal so that the output of said FM modulator assumes a constant frequency, and connecting an output of said digital modulator to said power amplifier through a third rf signal path, when a digital modulation mode is desired.

19. The method as set forth in claim 18 further including switchably disconnecting power to said digital modulator when the FM modulation mode is desired, and switchably connecting power to said digital modulator when the digital modulation mode is desired.

20. The method as set forth in claim 19 further including:

amplifying the output of said FM modulator using first and second rf amplifiers included within said first rf signal path when in the FM modulation mode, and amplifying the output of said FM modulator with only said first rf amplifier included within said second rf second path when in the digital modulation mode.

* * * * *